United States Patent [19]

Curkendall

[11] Patent Number: 5,526,772

[45] Date of Patent: Jun. 18, 1996

[54] ELECTRONIC IDENTIFICATION TAGGING METHOD FOR FOOD-PRODUCING ANIMALS

[76] Inventor: Leland D. Curkendall, 767 Whig St., Newark Valley, N.Y. 13811

[21] Appl. No.: 368,230

[22] Filed: Jan. 3, 1995

[51] Int. Cl.⁶ .................................................. A01K 11/00
[52] U.S. Cl. ................................... 119/174; A01K/11/00
[58] Field of Search ...................... 119/174, 51.02, 119/840, 906, 908; 40/300; 606/116, 117

[56] References Cited

U.S. PATENT DOCUMENTS 5,105,763  4/1992  Poiesz et al. ................... 119/51.02

FOREIGN PATENT DOCUMENTS 7810245  4/1980  Netherlands .................... 119/51.02
90/05448  5/1990  WIPO ............................... 119/51.02

*Primary Examiner*—Todd E. Manahan
*Attorney, Agent, or Firm*—Salzman & Levy

[57] ABSTRACT

The present invention features a method of electronic identification of bovine animals and other species. The method implants an electronic transponder subcutaneously in the leg of an animal, between the deep digital flexor tendon and the large metatarsal bone. The transponder is implanted between approximately one and six inches above the dew claw. The transponder is positioned so that it has a substantially vertical orientation when the animal is standing, making this method of insertion more reliable, since the implant can be accurately and more easily measured or scanned. Data representative of both the animal's identity and characteristics (e.g., temperature, activity, ownership, origin, etc.) can be monitored and/or recorded.

12 Claims, 1 Drawing Sheet

U.S. Patent  Jun. 18, 1996  5,526,772
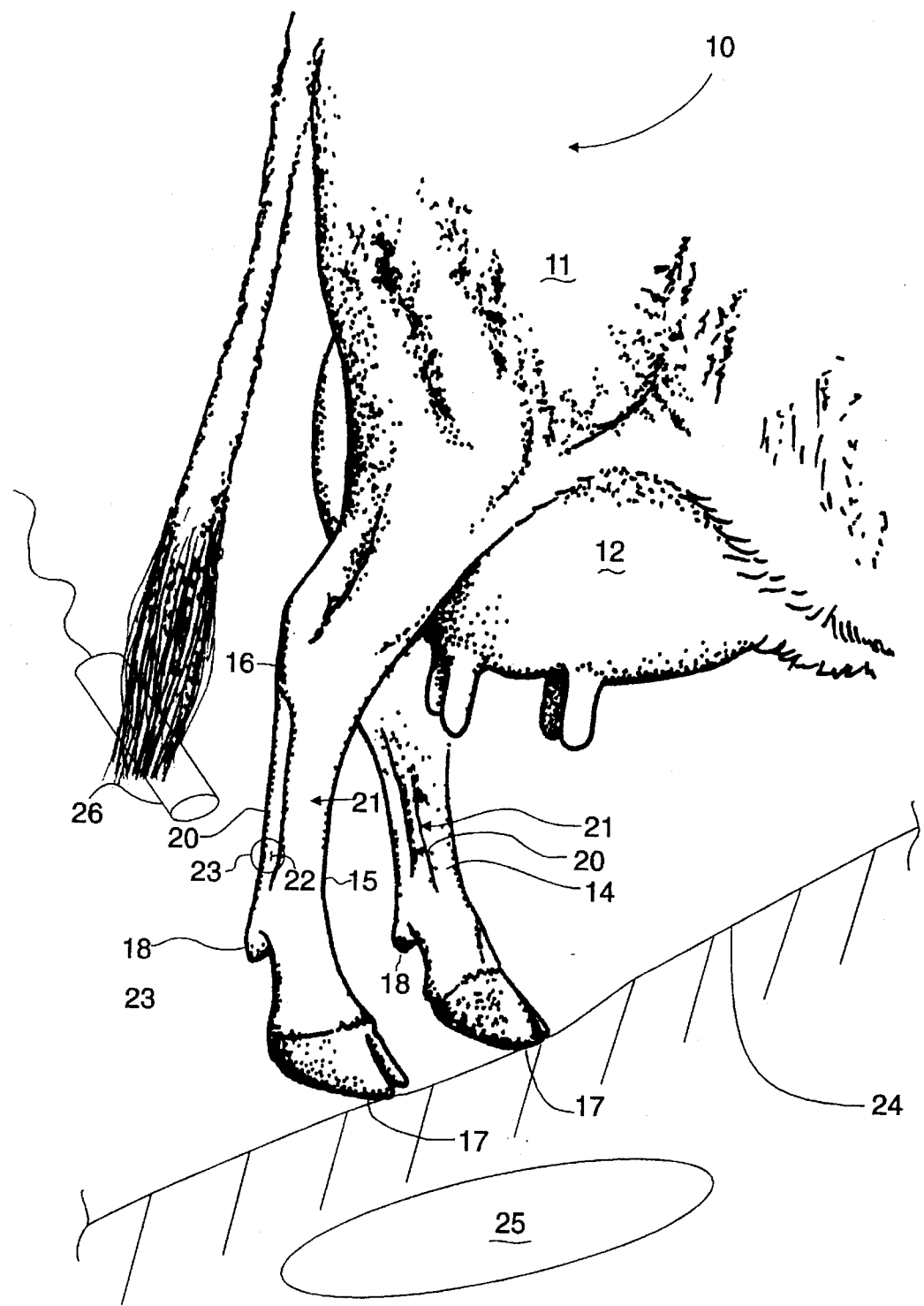
*The Figure*

ELECTRONIC IDENTIFICATION TAGGING METHOD FOR FOOD-PRODUCING ANIMALS

FIELD OF THE INVENTION

The present invention pertains to electronic identification tags for animals and, more particularly, to an electronic transponder implant method for domesticated bovine and other food-producing animal species.

BACKGROUND OF THE INVENTION

The procedure of branding, and externally tagging and tattooing bovine herds and other food-producing animals has recently been falling into disfavor. Currently under study is the method of electronic tagging, which is considered an alternative to the fire-branding procedure that is much more viable. "Electronic" branding has many advantages, one of which is the capability for individually monitoring an animal's behavior and characteristics (e.g., temperature, activity, ownership, origin, etc.), as well as identifying a particular animal specimen.

Anatomical implantation sites for such electronic identification transponders in food-producing animals have in the past included the ear, the subscutiform (where the ear attaches to the head), the eyesocket and the tail head.

Investigations by the federal Food & Drug Administration (FDA) have resulted in a rejection of an animal's tail head area as being considered unsafe. Trials involving the middle third of an animal's ear have shown poor durability of the transponders. Subscutiform implants have shown greater permanence, but this area of the body is considered dangerously close to a cut of meat used for human consumption. In addition, sites located about the head of an animal have proven to be generally difficult to electronically monitor with automated equipment.

The present invention seeks to implant an electronic identification tag subcutaneously in the leg of a cow or other food-producing animal. The preferred implant site is the rear leg, but the scope of the invention is not intended to be limited by any specific site. Such an implant site would have the advantage of affording safe food, since the proposed location is below the hock (the demarcation used to sever the carcass in most processing plants).

Another advantage of the invention is the reliability of the scanning of the transponder with respect to the leg orientation. The leg portion of the animal is essentially vertical at all times when the animal is standing, yielding accurate readings by stationary floor-mounted antennas.

A further advantage of this invention is the durability and security of the transponder when placed in the leg of the animals.

Another advantage of this invention is the fact that the transponder can be implanted easily in young animals.

Still another advantage of the leg placement site of this invention is the transponder's ability to be conveniently monitored with hand-held devices when animals are on raised platforms in dairies.

SUMMARY OF THE INVENTION

In accordance with the present invention, there is provided a method of electronic identification of bovine animals and other food-producing species. It is to be understood, however, that the invention can be used for other animals, including, but not limited to non-food-producing animals such as zoo animals, pets and other domesticated animals. The method implants an electronic transponder subcutaneously in the rear leg of a food-producing animal, between the deep digital flexor tendon and the large metatarsal bone. The transponder is implanted between approximately one and six inches above the dew claw. The transponder is positioned so that it has a substantially vertical orientation when the animal is standing, thereby making this method of insertion more reliable, since the implant can be accurately and more easily measured or scanned.

BRIEF DESCRIPTION OF THE DRAWINGS

A complete understanding of the present invention may be obtained by reference to the accompanying drawings, when considered in conjunction with the subsequent detailed description, in which:

THE FIGURE illustrates a perspective view of the implant site of the identification transponder with respect to a bovine animal, in accordance with the invention.

DESCRIPTION OF THE PREFERRED EMBODIMENT

Generally speaking, the invention is for a method of subcutaneously implanting an electronic tag in the hind leg of a food-producing animal, such as a cow. The implant is placed below the hock, so that if the animal is slaughtered for food, the portion of the hind leg containing the electronic tag will not appear in the food product. The electronic tag has a substantially vertical orientation when the animal is standing, thus making it easier to scan and monitor the animal.

Now referring to THE FIGURE, a hind portion 10 of a bovine animal (a cow 11) is illustrated in perspective view. The cow 11 is distinguished by its milking udders 12 and its two hind legs 14 and 15, respectively. Each leg has a hock portion 16, a hoof 17 and a dew claw 18.

Internally located in each leg 14 and 15 is a flexor tendon (located approximately by arrow 20) and a large metatarsal bone (located approximately by arrow 21).

The electronic tag 22 is implanted subcutaneously in a region 23 located between the flexor tendon 20 and the large metatarsal bone 21. The tag 22 has a generally vertical orientation (as shown) when the animal is standing.

The electronic tag 22 used in this invention is a transponder of the type manufactured by Destron/Fearing, Inc., of South St. Paul, Minn.

The tag 22 can be scanned or monitored from a detector 25 placed in the floor 24 of a dairy milking parlor or with a hand-held device 26, such as a device marketed by Remote Ag-Data Inc. of Newark Valley, N.Y. under the trademark ParlorScan. The detector 25 or 26 scans the area beneath the cow 11; when the transponder 22 is located, a reading identifying the animal will be taken and then recorded.

For purposes of definition, a food-producing animal can comprise species of, but not limited to, the bovine, ovine, porcine, bison, turkey, chicken, etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of implanting and monitoring an electronic tag in an animal, comprising:
   a) subcutaneously inserting an electronic tag within a leg of an animal; and
   b) monitoring said electronic tag in order to identify said animal or characteristics thereof.

2. The method of claim 1, wherein said electronic tag is inserted in said leg between a flexor tendon and a large metatarsal bone of said leg.

3. The method of claim 2, wherein said electronic tag is disposed substantially in a vertical orientation when said animal is standing.

4. The method of claim 1, wherein said monitoring operation (b) is automatically performed.

5. The method of claim 1, wherein said monitoring operation (b) is performed by Using a hand-held scanning device.

6. The method of claim 1, wherein said animal is a cow, and said monitoring operation (b) is performed during a milking operation.

7. The method of claim 1, wherein said inserting operation (a) includes inserting said electronic tag in a portion of the leg below the hock.

8. The method of claim 1, wherein said animal is a cow, and said inserting operation (a) includes inserting said electronic tag in a portion of the leg below the hock, but above the dew claw.

9. The method of claim 1, wherein said animal is a cow, and said inserting operation (a) includes inserting a transponder into said leg.

10. The method of claim 1, further comprising:
    c) recording data representative of the animal monitored in monitoring operation (b).

11. The method of claim 1, further comprising:
    c) identifying the animal monitored in monitoring operation (b).

12. The method of claim 1, further comprising:
    c) identifying the animal's characteristics monitored in monitoring operation (b).

* * * * *